US010078476B2

(12) United States Patent
Ozon et al.

(10) Patent No.: US 10,078,476 B2
(45) Date of Patent: Sep. 18, 2018

(54) IMAGE FORMING APPARATUS AND IMAGE FORMING METHOD

(71) Applicant: KYOCERA Document Solutions Inc., Osaka (JP)

(72) Inventors: Hazel Ozon, Osaka (JP); Rule Lymen Lagumbay, Osaka (JP); Jay Luzares, Osaka (JP); Kenneth Arrieta, Osaka (JP); Maurice James Sepe, Osaka (JP); Marie Stephanie Alesna, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 15/888,209

(22) Filed: Feb. 5, 2018

(65) Prior Publication Data

US 2018/0232186 A1 Aug. 16, 2018

(30) Foreign Application Priority Data

Feb. 15, 2017 (JP) .................................. 2017-026137

(51) Int. Cl.
*H04N 1/04* (2006.01)
*G06F 3/12* (2006.01)
(Continued)

(52) U.S. Cl.
CPC .......... *G06F 3/1247* (2013.01); *G06F 3/1208* (2013.01); *G06F 3/128* (2013.01);
(Continued)

(58) Field of Classification Search
CPC .... G06F 3/1247; G06F 3/1208; G06F 3/1224; G06F 3/1256; G06F 3/1271; G06F 3/128
(Continued)

(56) References Cited

U.S. PATENT DOCUMENTS 8,760,671 B2 * 6/2014 Yamada ............. H04N 1/00278
348/207.2
2006/0018223 A1 * 1/2006 Ji ....................... H04N 1/00278
369/47.12

(Continued)

FOREIGN PATENT DOCUMENTS

JP 2007-050649 A 3/2007
JP 2008-080707 A 4/2008

*Primary Examiner* — Houshang Safaipour
(74) *Attorney, Agent, or Firm* — IP Business Solutions, LLC

(57) ABSTRACT

An image forming apparatus includes a display section, an operation acceptance section, a printing section, an external terminal, a display control section, a readout control section, an interpreter section, and a control section. The readout control section reads metadata on a print job from a USB memory connected to the external terminal. The display control section uses a result of analysis of the metadata in the interpreter section to allow the display section to display a display prompting a user to specify a print target area in document data generated as the print job. The readout control section uses the result of analysis to read from the USB memory a portion of data corresponding to the specified print target area. The control section allows the printing section to perform print processing based on the read portion of data corresponding to the print target area.

9 Claims, 16 Drawing Sheets

(51) Int. Cl.
*G06K 15/02* (2006.01)
*G06K 15/00* (2006.01)

(52) U.S. Cl.
CPC .......... *G06F 3/1224* (2013.01); *G06F 3/1241* (2013.01); *G06F 3/1256* (2013.01); *G06F 3/1271* (2013.01); *G06K 15/005* (2013.01); *G06K 15/181* (2013.01); *G06K 15/1822* (2013.01); *G06K 15/1851* (2013.01); *G06K 2215/0008* (2013.01); *G06K 2215/0014* (2013.01); *G06K 2215/0025* (2013.01)

(58) Field of Classification Search
USPC ...................................... 358/1.15
See application file for complete search history.

(56) References Cited

U.S. PATENT DOCUMENTS

2007/0041040 A1   2/2007   Ozawa
2008/0079999 A1   4/2008   Yamada

\* cited by examiner

IMAGE FORMING APPARATUS AND IMAGE FORMING METHOD

INCORPORATION BY REFERENCE

This application claims priority to Japanese Patent Application No. 2017-026137 filed on Feb. 15, 2017, the entire contents of which are incorporated by reference herein.

BACKGROUND

The present disclosure relates to image forming apparatuses and image forming methods and particularly relates to a technique for allowing an image forming apparatus to perform print processing of a print job stored in an external memory.

There have recently been image forming apparatuses equipped with external terminals to which external memories, such as a USB (universal serial bus) memory, can be connected. In such an image forming apparatus, a user previously stores, in an external memory, data for use in print processing on the image forming apparatus and then connects the external memory to an external terminal of the image forming apparatus to allow the image forming apparatus to read the data from the external memory. In this manner, print processing of the data can be performed on the image forming apparatus.

Furthermore, various techniques for a general image forming apparatus are proposed in which, when an autorun program for allowing such an image forming apparatus to automatically perform print processing is previously stored in an external memory, the image forming apparatus automatically performs, upon connection of the external memory to an external terminal of the apparatus, the print processing according to the autorun program read by the image forming apparatus. For example, there is a first technique of extracting only unprinted data in a USB memory and automatically performing print processing using this unprinted data. For another example, there is a second technique in which an image forming apparatus detects a file from a USB memory connected thereto, analyzes the detected file to identify a language and acquire print settings (printing conditions) from the file, and performs print processing under the acquired printing conditions.

SUMMARY

A technique improved over the aforementioned techniques is proposed as one aspect of the present disclosure.

An image forming apparatus according to an aspect of the present disclosure includes a display section, an operation acceptance section, a printing section, an external terminal, a display control section, a readout control section, an interpreter section, and a control section. The operation acceptance section accepts an operating instruction from a user. The printing section performs print processing on a recording medium. The external terminal allows an external memory to be connected thereto. The display control section controls a display operation of the display section. The readout control section performs processing for reading data through the external terminal from the external memory. The interpreter section analyzes metadata read from the external memory. The control section controls the printing section. When the external memory is connected to the external terminal, the readout control section reads from the external memory an execution program for starting execution of the print processing. The readout control section further reads the metadata from the external memory according to the read execution program, the metadata containing: attribute information indicating a predetermined attribute of document data converted to printer language data contained in a print job to be subjected to the print processing; and association information for associating the printer language data with the document data. The interpreter section analyzes the attribute information and the association information of the metadata read by the readout control section. The display control section uses a result of analysis of the attribute information in the interpreter section to allow the display section to display: a file name representing the document data and previously contained as a portion of the attribute information in the metadata; and a display prompting the user to specify a print target area of the document data to be subjected to the print processing. When the operation acceptance section accepts a request to specify the print target area from the user, the readout control section uses a result of analysis of the association information in the interpreter section to read from the external memory a portion of the printer language data contained in the print job, the portion corresponding to the print target area specified by the request. When the readout control section reads the portion of printer language data corresponding to the specified print target area, the control section allows the printing section to perform the print processing based on the read portion of printer language data corresponding to the print target area according to the execution program read by the readout control section.

An image forming method for an image forming apparatus according to another aspect of the present disclosure includes a first readout step, a second readout step, an analyzing step, a displaying step, a third readout step, and a printing step. The first readout step is the step of reading from an external memory an execution program for starting execution of print processing in a printing section. The second readout step is the step of reading metadata from the external memory according to the read execution program, the metadata containing: attribute information indicating a predetermined attribute of document data converted to printer language data contained in a print job to be subjected to the print processing; and association information for associating the printer language data with the document data. The analyzing step is the step of analyzing the attribute information and the association information of the read metadata. The displaying step is the step of using a result of analysis of the attribute information to display: a file name representing the document data and previously contained as a portion of the attribute information in the metadata; and a display prompting a user to specify a print target area of the document data to be subjected to the print processing. The third readout step is the step of, when an operation acceptance section accepts a request to specify the print target area from the user, using a result of analysis of the association information to read from the external memory a portion of the printer language data contained in the print job, the portion corresponding to the print target area specified by the request. The printing step is the step of, upon readout of the portion of printer language data corresponding to the specified print target area, performing the print processing based on the read portion of printer language data corresponding to the print target area according to the read execution program.

BRIEF DESCRIPTION OF THE DRAWINGS

FIG. 3 is a functional block diagram showing the configuration of essential components of an information processing apparatus that allows the USB memory to store the print jobs and so on.

DETAILED DESCRIPTION

Figure 1:
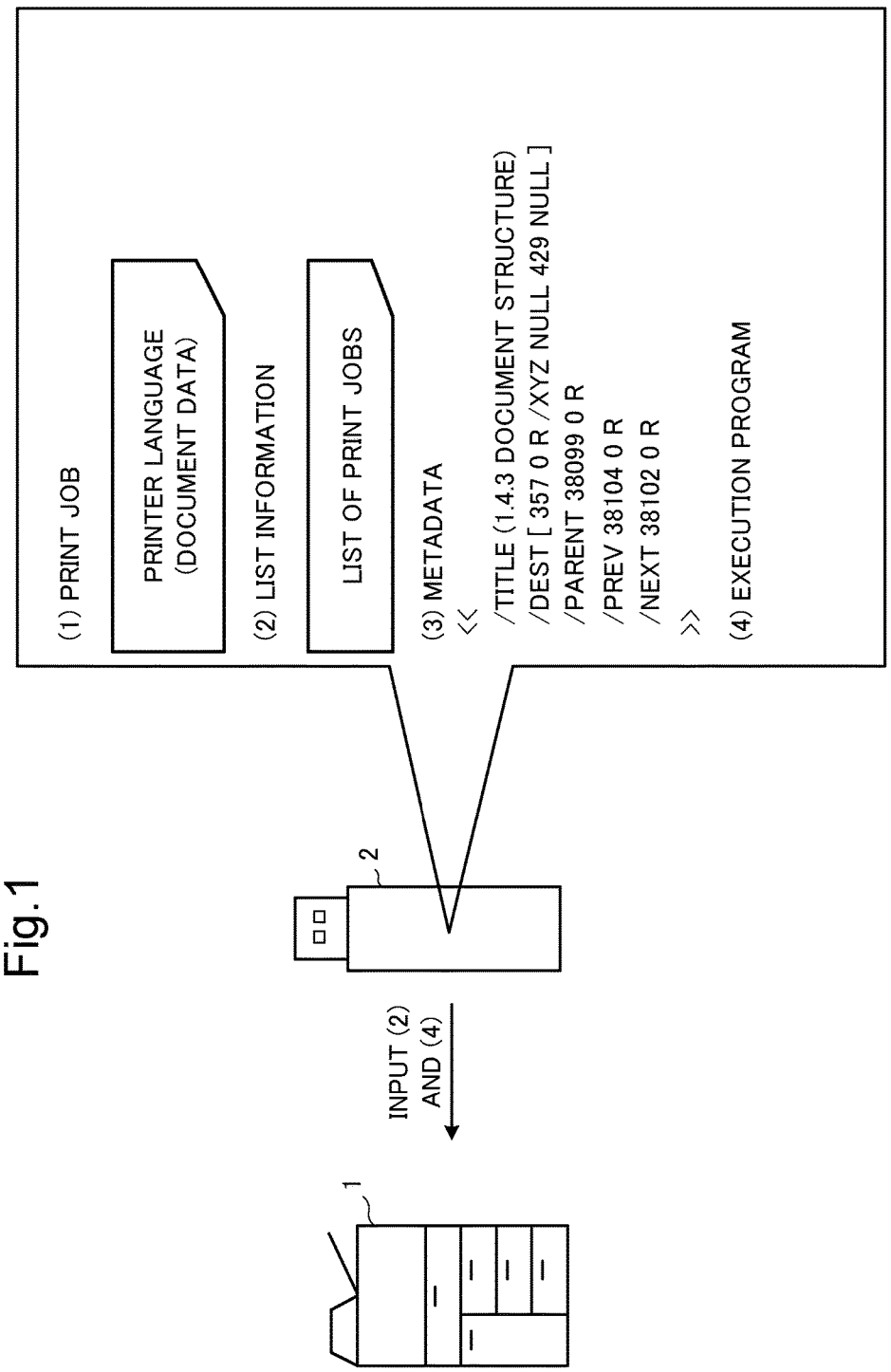
FIG. 1 is a diagram for illustrating an image forming method on an image forming apparatus according to one embodiment of the present disclosure.
Figure 2:
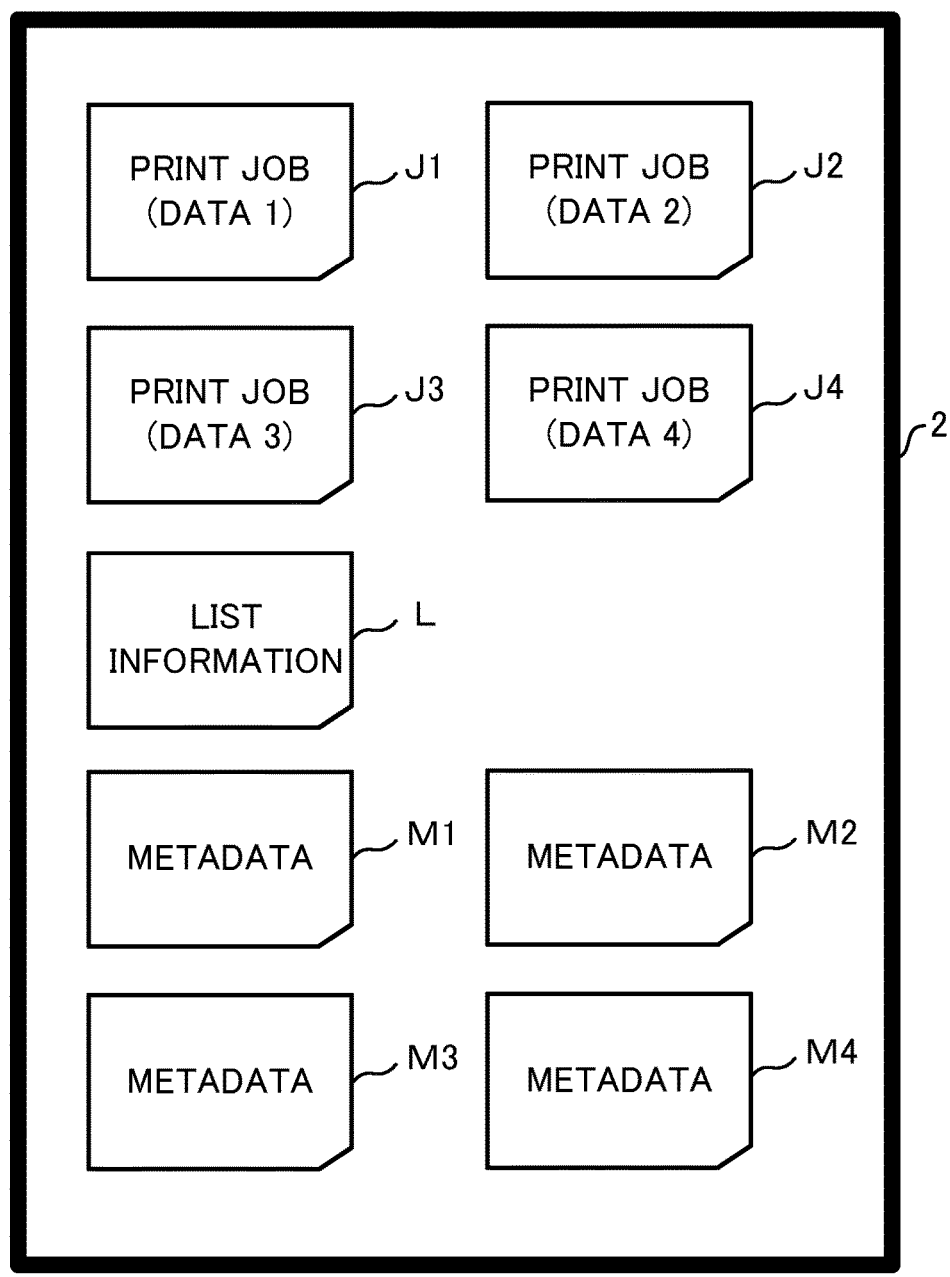
FIG. 2 is a diagram representing specific examples of print jobs, list information, and a set of metadata all of which are previously stored in a storage area of a USB memory.

Hereinafter, a description will be given of an embodiment showing an image forming apparatus and an image forming method for the image forming apparatus, both according to the present disclosure, with reference to the drawings. FIG. 1 is a diagram for illustrating an image forming method on an image forming apparatus according to one embodiment of the present disclosure. FIG. 2 is a diagram representing specific examples of print jobs, list information, and a set of metadata all of which are previously stored in a storage area of a USB memory.

An image forming apparatus 1 according to this embodiment performs print processing of data read from a USB memory 2 serving as an external memory. For example, as shown in FIG. 1, the USB memory 2 previously stores one or more print jobs for use in the above print processing, list information showing a list of the one or more print jobs, and metadata created for each print job and containing: attribute information indicating a predetermined attribute of document data converted to printer language data contained in the print job; and association information for associating the printer language data with the document data. In addition, the USB memory 2 previously stores an execution program (for example, an autorun) that allows the image forming apparatus 1 to start execution of the above print processing in a printing section to be described hereinafter. When the USB memory 2 is connected to the image forming apparatus 1 by a user's operation, the image forming apparatus 1 first reads the execution program from the USB memory 2 and then reads the list information and so on according to the execution program, as shown as Input (2) and (4) in FIG. 1. Then, print processing using the print job and the relevant metadata is executed on the image forming apparatus 1 by the operation of the image forming apparatus 1 according to the read execution program.

The above-described execution program, list information, and metadata are previously stored in a storage area of the USB memory 2 by a user's operation of a below-described information processing apparatus 7 (see FIG. 3), for example, a personal computer or a handheld terminal, such as a smartphone. More specifically, for example, as shown in FIG. 2, the following components are previously stored in the storage area of the USB memory 2: four print jobs J1, J2, J3, and J4, list information L showing a list of these four print jobs J1, J2, J3, and J4, metadata M1 on the print job J1, metadata M2 on the print job J2, metadata M3 on the print job J3, and metadata M4 on the print job J4. The list information L contains, for example, a name "Data 1" of the print job J1, a name "Data 2" of the print job J2, a name "Data 3" of the print job J3, and a name "Data 4" of the print job J4. These names "Data 1" to "Data 4" are file names representing the corresponding pieces of document data.

Figure 3:
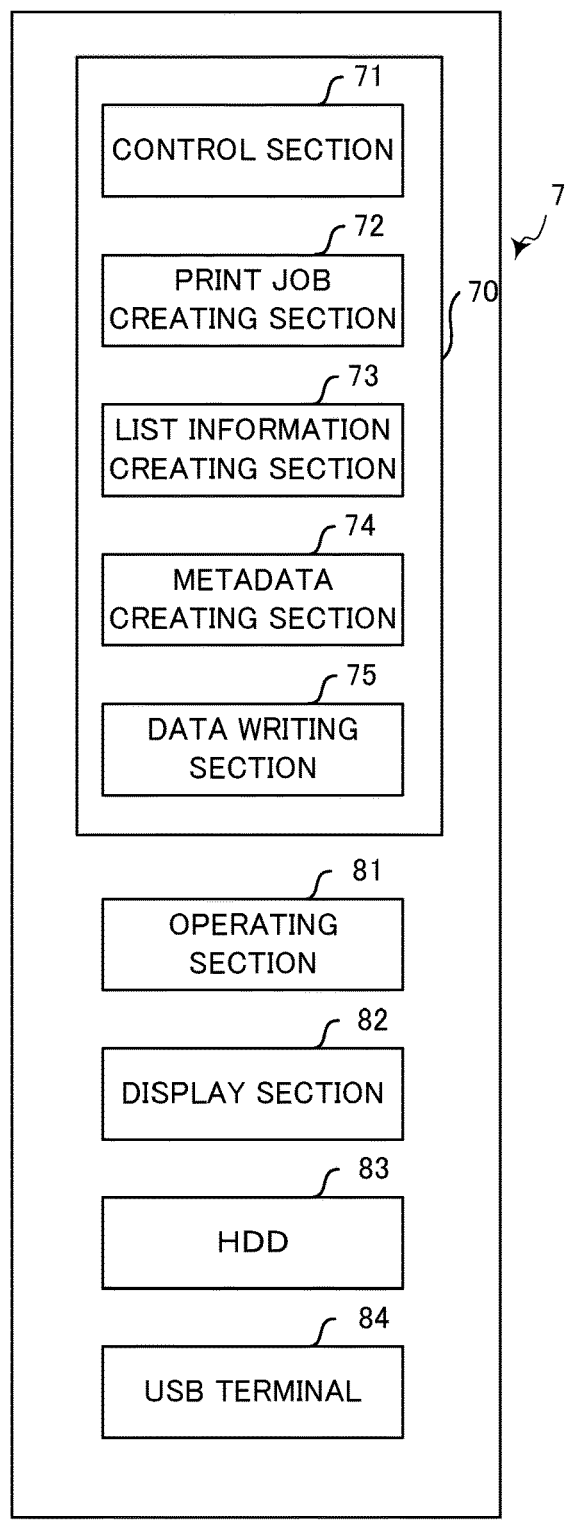

Now, a detailed description will be given of the information processing apparatus 7 with reference to FIG. 3. FIG. 3 is a functional block diagram showing the configuration of essential components of the information processing apparatus 7 that allows a USB memory to store print jobs and so on.

The information processing apparatus 7 includes a control unit 70, an operating section 81, a display section 82, an HDD 83, and a USB terminal 84. These components are capable of transferring data or signals to and from one another via a CPU bus. The control unit 70 is composed of a processor, a RAM (random access memory), a ROM (read only memory), and so on. The processor is, for example, a CPU (central processing unit), an MPU (micro-processing unit) or an ASIC (application specific integrated circuit). When a print request program stored on the above HDD 83 or the like is executed by the above processor, the control unit 70 functions as a control section 71, a print job creating section 72, a list information creating section 73, a metadata creating section 74, and a data writing section 75. Alternatively, each of the control section 71, the print job creating section 72, the list information creating section 73, the metadata creating section 74, and the data writing section 75 of the control unit 70 may not be implemented by the operation of the control unit 70 in accordance with the print request program but may be constituted by a hardware circuit. Hereinafter, the same applies to the other embodiments unless otherwise stated.

The control section 71 governs the overall operation control of the information processing apparatus 7.

Furthermore, the control section 71 reads out, according to a user's operation of the operating section 81, document data stored on the HDD 83 or document data from the outside of the information processing apparatus 7, for example, a server or the like connected via a network, such as a LAN, to a communication module, such as a LAN board, of the information processing apparatus 7.

The document data is, for example, a file or image data, such as jpeg or PDF, that is created by an application, such as a word processor, a spreadsheet or graphics software, running on the information processing apparatus 7. However, the document data is data that does not have a format suitable for the image forming apparatus 1 and printing thereon and therefore cannot be used directly for print processing on the image forming apparatus 1.

The print job creating section 72 creates, from document data, a print job for print processing on the image forming apparatus 1. For example, the print job creating section 72 creates a print job (for example, a PRN file) from the document data read out by the control section 71. More specifically, the print job creating section 72 operates according to a printer driver stored on the HDD 83 to convert the document data to printer language data (i.e., data in a printer language format) suitable for the image forming apparatus 1 and create a print job for print processing containing the printer language data converted from the document data. Furthermore, when converting the document data to the printer language data, the print job creating section 72 creates conversion information indicating a correspondence relation between the document data and the printer language data and outputs the conversion information to the metadata creating section 74.

When the print job creating section 72 creates one or more print jobs, the list information creating section 73 creates list information showing a list of the one or more print jobs.

When the print job creating section 72 creates one or more print jobs, the metadata creating section 74 creates, for each created print job, metadata containing: attribute information indicating a predetermined attribute of document data converted to printer language data contained in the print job; and association information for associating the printer language data with the document data.

Figure 4:
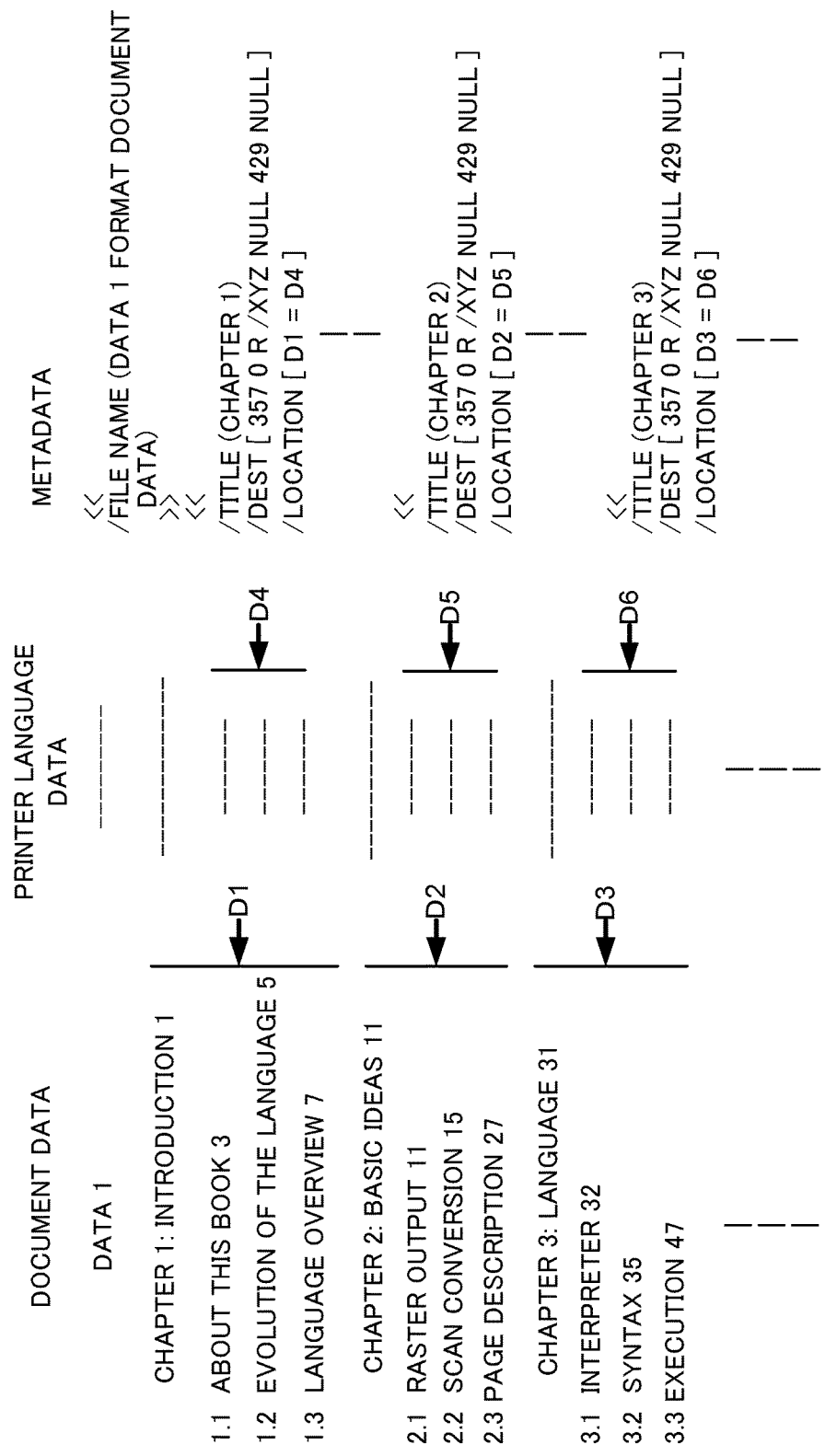
FIG. 4 is a diagram representing an example of metadata that is previously stored in the storage area of the USB memory and relates to document data.

The metadata contains, for example, as shown in FIG. 4, some pieces of attribute information indicating predetermined attributes of the document data, including a "File Name (document name)" of the document data, an unshown "Page Number", an unshown "Copyright Holder", and an unshown "Saved Date", and "keywords", such as predetermined segments in the document data, for example, chapters. The above pieces of attribute information are created together with the document data and attached to the document data when the document data is created by the above application. When the print job creating section 72 creates a print job from the document data, the metadata creating section 74 acquires attribute information attached to the document data and incorporates the acquired attribute information as a portion of the metadata into the metadata.

The metadata further contains association information for associating the printer language data contained in the print job with the document data. This association information indicates to which portion of printer language data converted from document data each portion of the contents of the document data corresponds. When a print job is created by the print job creating section 72, i.e., when document data is converted to printer language data, the metadata creating section 74 acquires conversion information at the conversion from the print job creating section 72, creates association information based on the acquired conversion information, and incorporates the created association information as a portion of the metadata into the metadata. For example, when a print job is created from document data having a file name "Data 1", the metadata creating section 74 acquires, as conversion information from the print job creating section 72, information that the contents D1 of Chapter 1 correspond to a portion D4 of printer language data, the contents D2 of Chapter 2 correspond to a portion D5 of the printer language data, and the contents D3 of Chapter 3 correspond to a portion D6 of the printer language data. Then, the metadata creating section 74 creates, based on the acquired conversion information, a piece of association information indicating "D1=D4", a piece of association information indicating "D2=D5", and a piece of association information indicating "D3=D6" and incorporates the created pieces of association information into the metadata. Furthermore, for example, the metadata creating section 74 acquires, as conversion information from the print job creating section 72, information that the contents of page 1 of the document data are the above contents D1 and contents D2, creates association information (not shown) based on the acquired conversion information, and incorporates the created association information as a portion of the metadata into the metadata.

When the USB memory 2 is connected to the USB terminal 84, the data writing section 75 writes, into the USB memory 2 and according to a user's operation of the operating section 81, the above execution program previously stored on the HDD 83 or the like, the one or more print jobs created by the print job creating section 72, the list information created by the list information creating section 73, and the metadata created by the metadata creating section 74.

The operating section 81 includes a keyboard, a mouse or a touch panel, through which an instruction to specify document data to be printed or like instruction is input to the operating section 81 by the user.

The display section 82 is formed of a display, such as an LCD (liquid crystal display), and displays various types of information, such as operation guidance for the user. Furthermore, the display section 82 is provided with an unshown touch panel.

Figure 5:
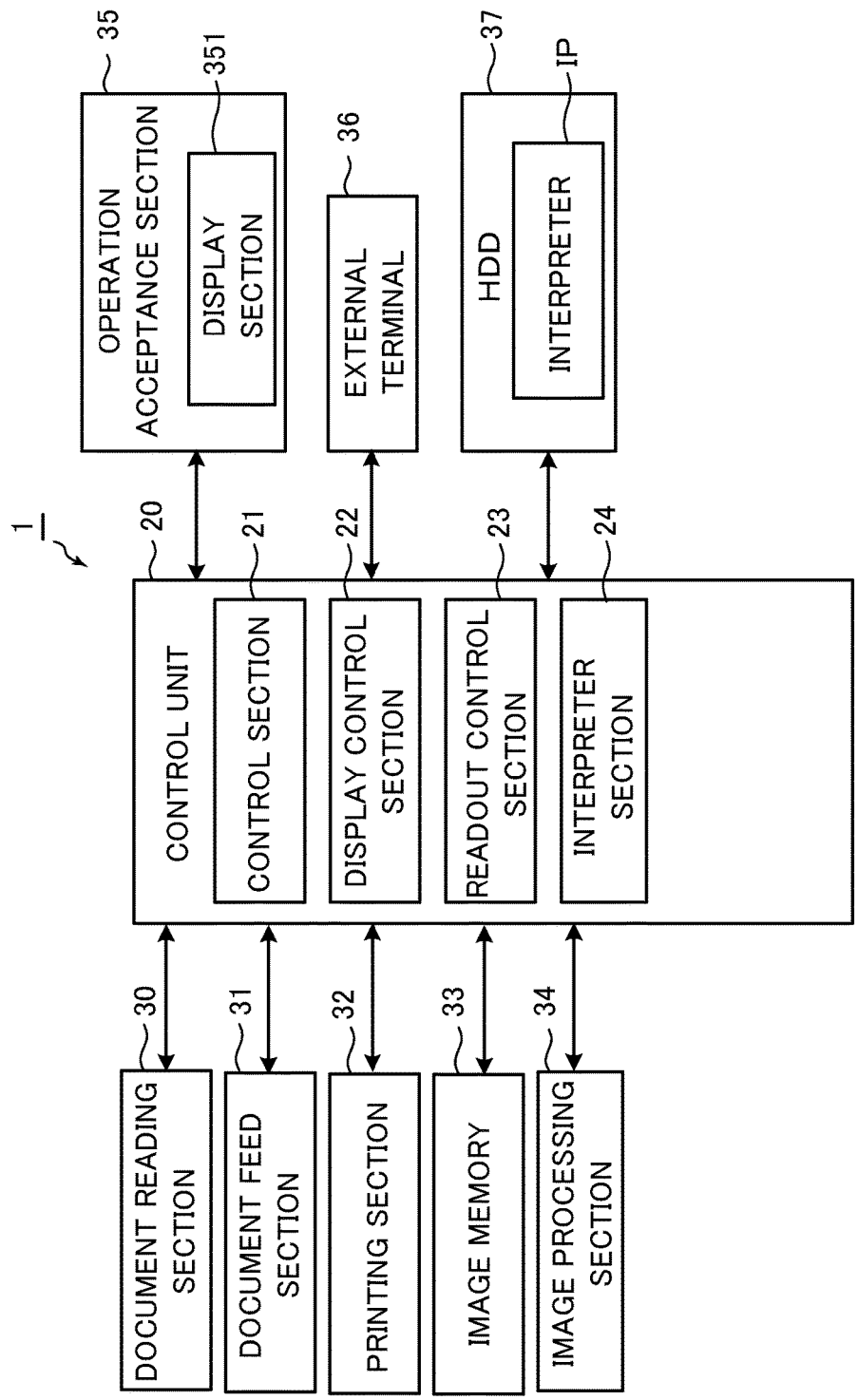
FIG. 5 is a functional block diagram showing the configuration of essential components of the image forming apparatus.

Next, a detailed description will be given of the image forming apparatus 1 according to this embodiment with reference to FIG. 5. FIG. 5 is a functional block diagram showing the configuration of essential components of the image forming apparatus 1.

As shown in FIG. 5, the image forming apparatus 1 is a multifunction peripheral having multiple functions including, for example, a copy function, a print function, a scan function, and a facsimile function. The image forming apparatus 1 includes a control unit 20. The control unit 20 is composed of a CPU, a RAM, a ROM, a dedicated hardware circuit, and so on and governs the overall operation control of the image forming apparatus 1.

The image forming apparatus 1 further includes a document reading section 30, a document feed section 31, a printing section 32, an image memory 33, an image processing section 34, an operation acceptance section 35, an external terminal 36, and an HDD 37.

The operation acceptance section 35 accepts user's instructions for various types of operations and processing executable on the image forming apparatus 1, including an instruction to perform an image forming operation and an instruction to perform a document reading operation. The operation acceptance section 35 includes a display section 351 that displays various types of information, such as operation guidance for the user. The display section 351 is provided with an LCD or the like having a touch panel function.

In the document reading operation of the image forming apparatus 1, the document reading section 30 optically reads an image of an original document being fed by the document feed section 31 and generates image data from the read image.

In the image forming operation (i.e., the printing operation) of the image forming apparatus 1, based on image data generated by the above document reading operation, a print job read from the USB memory 2 or created by a printer driver section or other data, a below-described control section of the control unit 20 allows the printing section 32 to perform print processing on a recording paper sheet serving as a recording medium fed from an unshown sheet feed section to form an image on the recording paper sheet.

The document reading section 30 is under control of the control unit 20 and includes a reader (not shown) including a lighting part, a CCD sensor, and so on. The document reading section 30 reads a document image from an original document by irradiating the original document with light using the lighting part and receiving the reflected light on the CCD sensor and generates image data from the read document image.

The image memory 33 provides a region that temporarily stores image data of the document image acquired by reading by the document reading section 30 and temporarily saves data for print processing to be printed by the printing section 32.

The image processing section 34 reads from the image memory 33 an image read by the document reading section 30 and processes the image. For example, in order that the image read by the document reading section 30 will be improved in quality after the formation of an image in the printing section 32, the image processing section 34 performs predetermined image processing, such as shading correction.

The printing section 32 forms an image of image data read by the document reading section 30, an image of a print job read from the USB memory 2, or other images. Specifically, although not shown in the figure, in the case where the printing section 32 performs color printing, an image forming unit for magenta, an image forming unit for cyan, an image forming unit for yellow, and an image forming unit for black of the printing section 32 are subjected to charge, exposure, and development processes based on the associated image formed of one of color components constituting the data to be printed, thus forming respective toner images on their respective photosensitive drums, and then allow their respective primary transfer rollers to transfer the toner images to an intermediate transfer belt.

The toner images of different colors to be transferred to the intermediate transfer belt are superposed each other on the intermediate transfer belt by controlling their transfer timings, resulting in a multicolor toner image. Although not shown in the figure, a secondary transfer roller transfers the multicolor toner image formed on the surface of the intermediate transfer belt, at a nip between the intermediate transfer belt and a drive roller, to a recording paper sheet conveyed from the sheet feed section along a conveyance path. Thereafter, a fixing section (not shown) fixes the toner image on the recording paper sheet by application of heat and pressure. The recording paper sheet having a color image fixed thereon by the completion of the fixing is discharged to an unshown sheet output tray.

The external terminal 36 is, for example, a USB memory interface and allows the USB memory 2 to be connected thereto by the user.

The HDD (hard disc drive) 37 is a large storage device capable of storing document images read by the document reading section 30 or other data. Furthermore, the HDD 37 previously stores an interpreter IP.

The control unit 20 is composed of a CPU, a ROM, a RAM, and so on and governs the overall operation of the image forming apparatus 1. The control unit 20 includes a control section 21, a display control section 22, a readout control section 23, and an interpreter section 24.

The control unit 20 is composed of a processor, a RAM (random access memory), a ROM (read only memory), and so on. The processor is, for example, a CPU (central processing unit), an MPU or an ASIC. When a print execution program stored on the HDD 37 or the like is executed by the above processor, the control unit 20 functions as the control section 21, the display control section 22, and the readout control section 23. Alternatively, each of the control section 21, the display control section 22, and the readout control section 23 may not be implemented by the operation of the control unit 20 in accordance with the print execution program but may be constituted by a hardware circuit. Hereinafter, the same applies to the other embodiments unless otherwise stated. Furthermore, when the processor executes the interpreter IP stored on the HDD 37, the control unit 20 functions as the interpreter section 24.

The control section 21 governs the overall operation of the image forming apparatus 1 and is connected to the document reading section 30, the document feed section 31, the printing section 32, the image memory 33, the operation acceptance section 35, the external terminal 36, the HDD 37, and so on to control the operations of these components.

Furthermore, when the readout control section 23 reads a portion of printer language data corresponding to a below-described specified print target area from the USB memory 2, the control section 21 allows the printing section 32 to perform print processing based on the read portion of printer language data corresponding to the below-described print target area according to the execution program read from the USB memory 2 by the readout control section 23.

The interpreter section 24 analyzes the attribute information and association information of the metadata read from the USB memory 2 by the readout control section 23. Furthermore, when analyzing the attribute information of the metadata, the interpreter section 24 determines, as print target areas in the document data capable of being subjected to print processing, all pages of the document data, page units of the document data, and segment units obtained by dividing the document data into predetermined segments. Moreover, the interpreter section 24 creates a list of the determined segment units. In addition, when analyzing the association information of the metadata, the interpreter section 24 identifies, among the printer language data contained in the print job, respective portions of printer language data corresponding to the print target areas.

The display control section 22 controls a display operation of the display section 351. For example, the display control section 22 allows the display section 351 to display a display prompting the user to specify any print job to be subjected to print processing, based on the list information read by the readout control section 23. Furthermore, using a result of analysis of the attribute information of the metadata in the interpreter section 24, the display control section 22 allows the display section 351 to display: a file name representing the document data and previously contained as a portion of the attribute information in the metadata; and a display prompting the user to specify any print target area of the document data to be subjected to the print processing. In relation to the display prompting the user to specify any print target area, the display control section 22 allows the display section 351 to display, as specification items that can be specified by the user, 'all pages', 'page units', and 'segment units' determined as print target areas by the interpreter section 24. When the operation acceptance section 35 accepts a request to specify 'segment units' as a print target area from the user, the display control section 22 allows the display section 351 to display the above list in which the segment units determined by the interpreter section 24 are shown as specification items that can be more concretely specified by the user.

When the USB memory 2 is connected to the external terminal 36, the readout control section 23 reads the execution program from the USB memory 2. Furthermore, after reading the execution program, the readout control section 23 reads the list information from the USB memory 2 according to the read execution program. When the operation acceptance section 35 accepts a request to specify a print job to be subjected to print processing from the user, the readout control section 23 reads metadata on the print job from the USB memory 2. In addition, when the operation acceptance section 35 accepts a request to specify a print target area from the user, the readout control section 23 uses a result of analysis of the metadata in the interpreter section 24 to read from the USB memory 2 a portion of the printer language data contained in the print job, the portion corresponding to the print target area specified by the request.

In the image forming apparatus 1, under control of the control section 21, the following image forming method is performed. This image forming method includes a first readout step of reading from the USB memory 2 the execution program for starting execution of print processing in the printing section 32, and a second readout step of reading metadata from the USB memory 2 according to the read execution program, the metadata containing: attribute information indicating a predetermined attribute of document data converted to printer language data contained in a print job to be subjected to the print processing; and association information for associating the printer language data with the document data.

This image forming method further includes: an analyzing step of analyzing the attribute information and the association information of the read metadata; a displaying step of using a result of analysis of the attribute information to display a file name representing the document data and previously contained as a portion of the attribute information in the metadata and a display prompting the user to specify a print target area of the document data to be subjected to the print processing; a third readout step of, when the operation acceptance section 35 accepts a request to specify the print target area from the user, using a result of analysis of the association information to read from the USB memory 2 a portion of the printer language data contained in the print job, the portion corresponding to the print target area specified by the request; and a printing step of, upon readout of the portion of printer language data corresponding to the specified print target area, performing the print processing based on the read portion of printer language data corresponding to the print target area according to the read execution program. The details of this image forming method will be described with reference also to FIG. 6.

Figure 6:
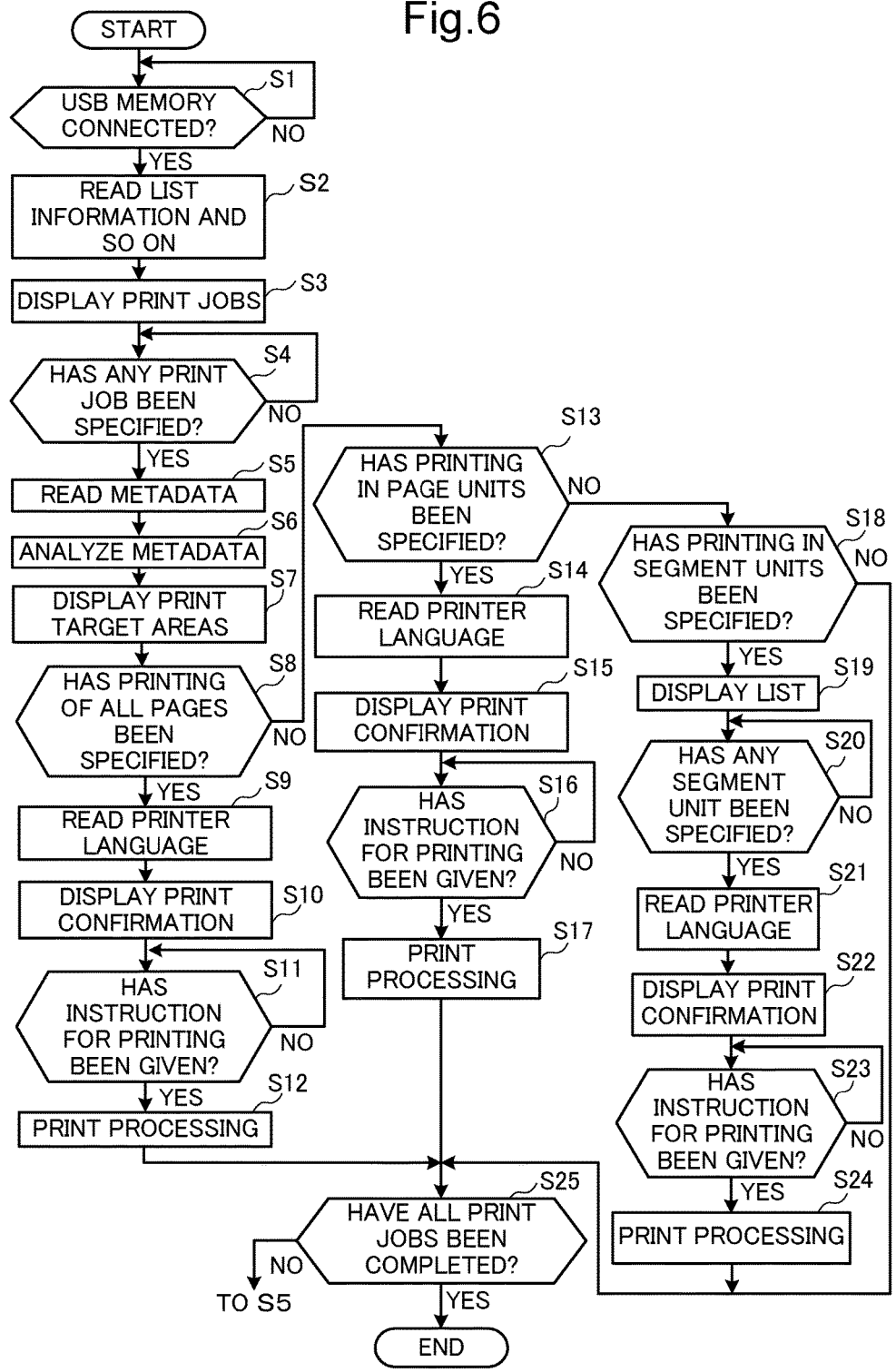
FIG. 6 is a flowchart showing a flow of processing on the image forming apparatus.

Next, a detailed description will be given of the operation of the image forming apparatus 1 according to this embodiment. FIG. 6 is a flowchart showing a flow of processing on the image forming apparatus 1. The following description is given mainly of print processing through the USB memory 2 on the image forming apparatus 1.

The control unit 21 determines whether or not the USB memory 2 is connected to the external terminal 36 by the user (S1). When determining that the USB memory 2 is not connected to the external terminal 36 (NO in S1), the control section 21 allows the image forming apparatus 1 to stand by.

On the other hand, when the control section 21 determines that the USB memory 2 is connected to the external terminal 36 (YES in S1), the readout control section 23 reads the execution program from the USB memory 2 and then reads list information according to this execution program (S2: first readout step).

Subsequently, the display control section 22 allows the display section 351 to display a display prompting the user to specify any print job to be subjected to print processing, based on the read list information (S3).

Figure 7:
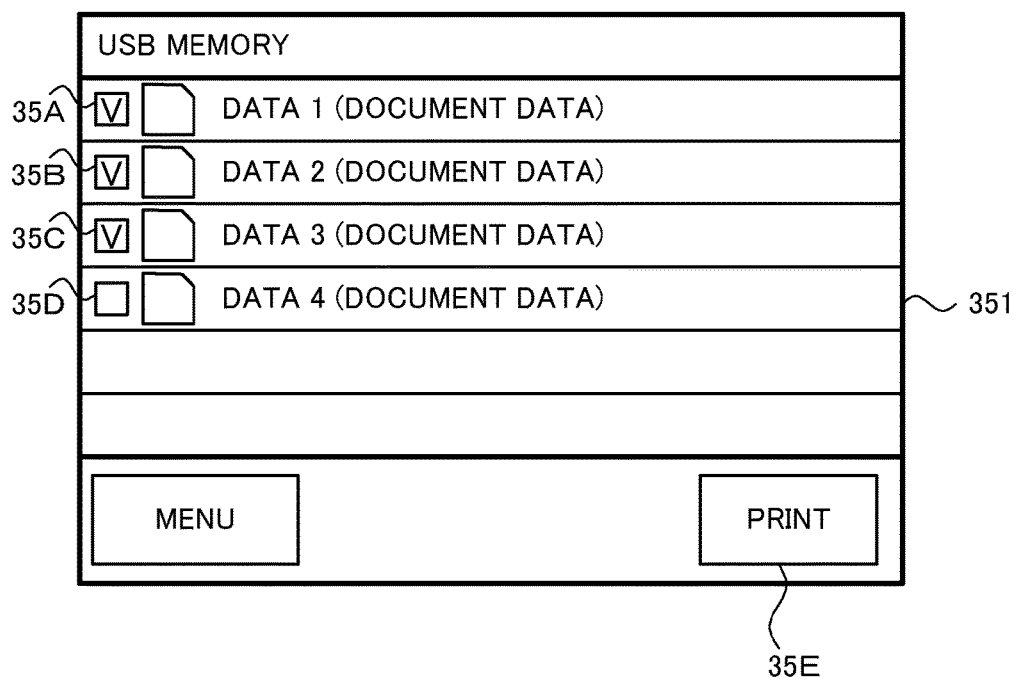
FIG. 7 is a view showing an example of a display screen displayed on a display section of the image forming apparatus.

For example, as illustrated in FIG. 7, the display control section 22 allows the display section 351 to display, for four print jobs J1, J2, J3, and J4 (see FIG. 2) previously stored in the USB memory 2, their names "Data 1", "Data 2", Data 3", and "Data 4", respectively. Furthermore, as shown in FIG. 7, in order that the user can specify each of the print jobs J1, J2, J3, and J4 of "Data 1", "Data 2", "Data 3", and "Data 4", the display control section 22 allows the display section 351 to display check boxes 35A, 35B, 35C, and 35D in each of which an image indicating that it has been selected by the user can be displayed.

Subsequently, the control section 21 determines whether or not a user's request to specify at least one print job to be subjected to print processing has been accepted by the operation acceptance section 35 (S4). In other words, the control section 21 determines whether or not any print job the print processing for which is desired by the user has been specified. For example, the control section 21 determines whether or not any of the check boxes 35A, 35B, 35C, and 35D and a Print key 35E in the display screen shown in FIG. 7 have been specified by the user. When the above touch panel function does not detect that any of the check boxes 35A, 35B, 35C, and 35D has been specified (NO in S4), the control section 21 allows the image forming apparatus 1 to stand by.

On the other hand, for example, when the check boxes 35A, 35B, and 35C have been specified by the user, the touch panel function detects that this specification has been accepted (as shown by check marks "V" in FIG. 7), the Print key 35E has been specified by the user, and the touch panel function detects that this specification has been accepted (YES in S4), the control section 21 determines that the print jobs J1, J2, and J3 of "Data 1", "Data 2", and "Data 3" have been specified as print jobs to be subjected to print processing. Then, the control section 21 allows each of the specified print jobs J1 to J3 to be subjected to the following processing. The following description is given taking, as an example, processing for the print job J1 of "Data 1".

Subsequently, the readout control section 23 reads from the USB memory 2 metadata M1 (see FIG. 2) on the specified print job J1 of "Data 1" (S5: second readout step).

Then, the interpreter section 24 analyzes attribute information and association information of the read metadata M1 (S6: analyzing step). Specifically, the interpreter section 24 analyzes the metadata M1 to determine, as print target areas capable of being subjected to print processing in document data generated as the print job J1, all pages of the document data, page units of the document data, and segment units obtained by dividing the document data into predetermined segments. Furthermore, the interpreter section 24 creates a list of a plurality of determined segment units. For example, the interpreter section 24 uses chapters in the document data as the above predetermined segments, as will hereinafter be described in detail.

Subsequently, the display control section 22 uses a result of analysis of the attribute information of the metadata M1 in the interpreter section 24 to allows the display section 351 to display: a file name representing the document data and previously contained as a portion of the attribute information in the metadata M1; and a display prompting the user to specify any print target area of the document data to be subjected to the print processing (S7: displaying step). Furthermore, in relation to the display prompting the user to specify any print target area, the display control section 22 allows the display section 351 to display, as specification items that can be specified by the user, 'all pages', 'page units', and 'segment units' determined as print target areas by the interpreter section 24.

Figure 8:
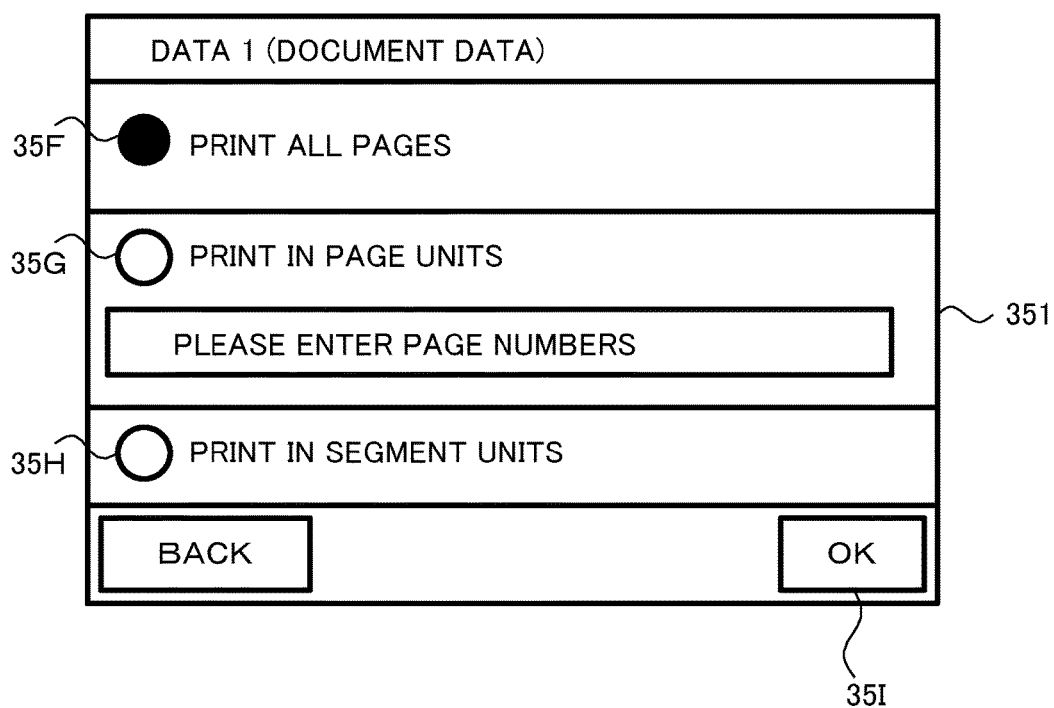
FIG. 8 is a view showing an example of another display screen displayed on the display section of the image forming apparatus.

For example, as illustrated in FIG. 8, the display control section 22 allows the display section 351 to display the file name of the document data, i.e., the name "Data 1" of the print job J1, and also display "Print All Pages", "Print in Page Units", and "Print in Segment Units" as the print target areas. Furthermore, as shown in FIG. 8, in order that the user can specify one of the print target areas "Print All Pages", "Print in Page Units", and "Print in Segment Units" as a specification item, the display control section 22 allows the display section 351 to display check circles 35F, 35G, and 35H in each of which an image indicating that it has been selected by the user can be displayed.

Then, the control section 21 determines whether or not a user's request to specify a print target area has been accepted by the operation acceptance section 35 (S8). The control section 21 determines whether or not a user's instruction to print all pages of the document data has been given, for example, by detecting whether or not the check circle 35F and an OK key 35I in the display screen shown in FIG. 8 have been specified by the user. When the above touch panel function does not detect that the check circle 35F has been specified (NO in S8), the control section 21 determines that printing of all pages is not intended, and the process proceeds to S13 described below.

On the other hand, when the check circle 35F has been specified by the user, the touch panel function detects that this specification has been accepted (as shown by a filled circle in FIG. 8), the OK key 35I has been specified by the user, and the touch panel function detects this specification has been accepted (YES in S8), the control section 21 determines that a request to print all pages of the document data has been given. Then, the readout control section 23 uses a result of analysis of the association information of the metadata M1 to read printer language data constituting all the pages as the data portion corresponding to the print target area from the USB memory 2 (S9: third readout step).

Figure 9:
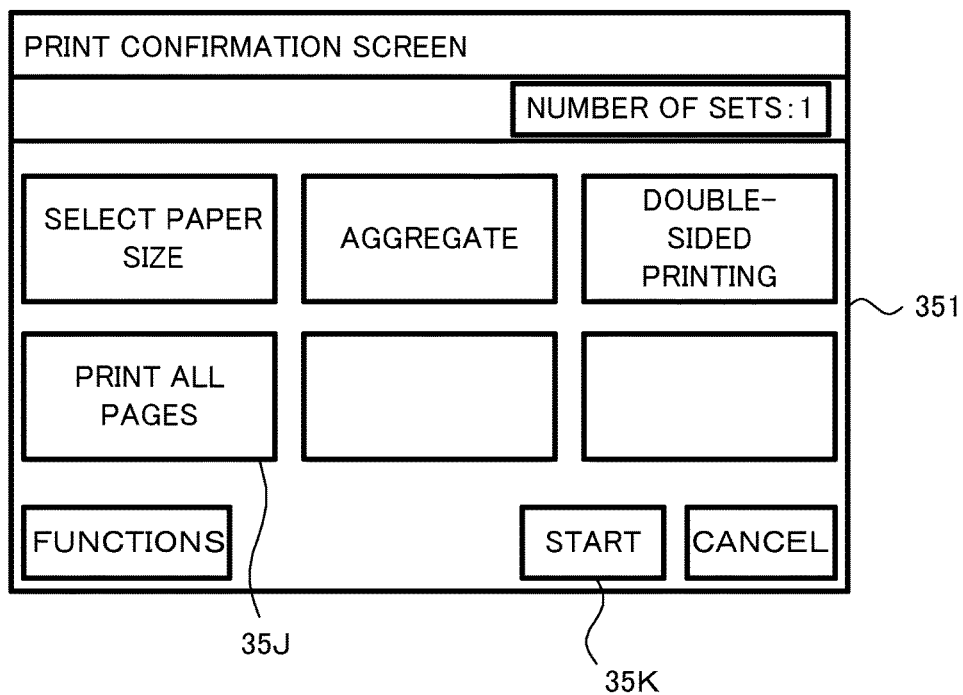
FIG. 9 is a view showing an example of still another display screen displayed on the display section of the image forming apparatus.

Subsequently, the display control section 22 allows the display section 351 to display a display prompting the user to confirm that print processing for all the pages should be executed (S10). For example, as illustrated in FIG. 9, the display control section 23 allows the display section 351 to display a display screen containing a Print All Pages key 35J and a Start key 35K. As shown by examples, such as "Number of Sets", "Select Paper Size", "Aggregate", and "Double-Sided Printing", in FIG. 9, the user can set printing conditions for the print processing on this display screen (and the same applies to FIGS. 11 and 14 described below).

Then, the control section 21 determines whether or not a user's instruction to execute the print processing for all the pages has been accepted by the operation acceptance section 35 (S11). For example, the control section 21 determines whether or not the Print All Pages key 35J and the Start key 35K in the display screen shown in FIG. 9 have been specified by the user. When the above touch panel function does not detect that the Print All Pages key 35J and the Start key 35K have been specified (NO in S11), the control section 21 allows the image forming apparatus 1 to stand by.

On the other hand, when the Print All Pages key 35J and the Start key 35K have been specified by the user and the touch panel function detects that this specification has been accepted (YES in S11), the control section 21 determines that a user's instruction to execute the print processing for all the pages has been given. Then, the control section 21 allows the printing section 32 to perform the print processing based on the read printer language data constituting all the pages (S12: printing step). Thereafter, the process proceeds to S25 described below.

As an alternative to the manner described above, after the readout control section 23 reads out the data portion corresponding to the print target area, the control section 21 may subsequently allow, without displaying a display prompting the user to confirm the execution of the print processing (S10: print confirmation display), the printing section 32 to perform the print processing based on the data portion corresponding to the print target area according to the read execution program (and the same applies to S15 and S22 described below).

Figure 10:
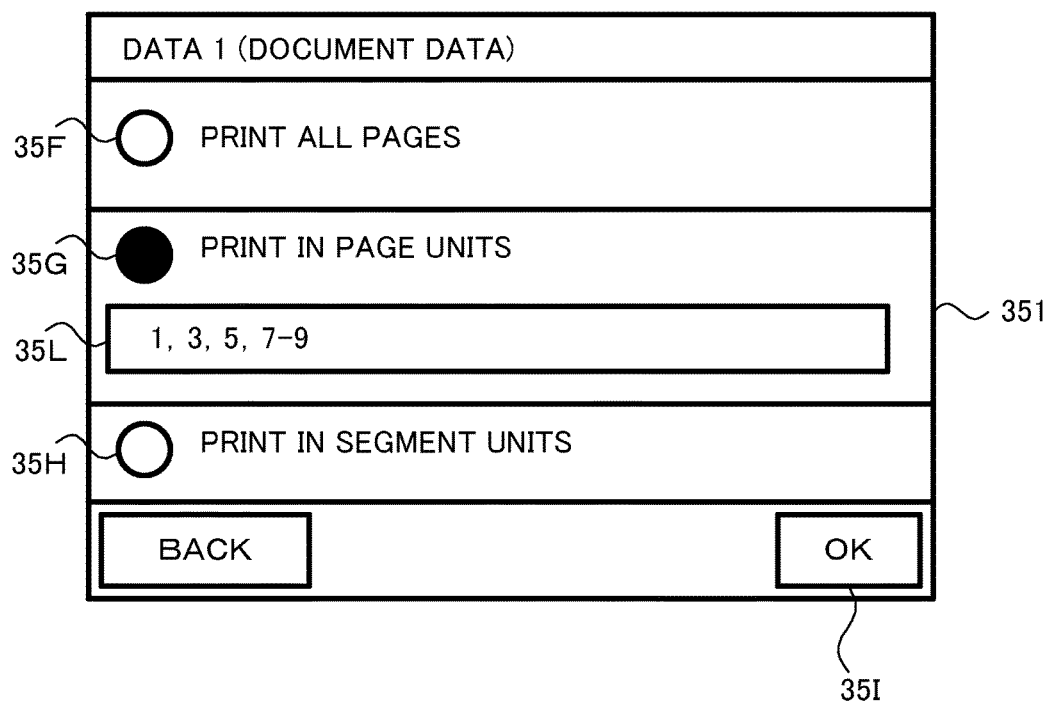
FIG. 10 is a view showing an example of still another display screen displayed on the display section of the image forming apparatus.

When the process proceeds to S13 (NO in S8), the control section 21 detects whether or not the check circle 35G and the OK key 35I in the display screen shown in FIG. 10 have been specified by the user and whether the user has entered any page corresponding to a print target into a page specification field 35L for specifying pages corresponding to print targets, and thus determines whether or not a user's instruction to print the document data in the specified page units has been given (S13). When the above touch panel function does not detect that the check circle 35G has been specified by the user (NO in S13), the control section 21 determines that printing in page units is not intended, and the process proceeds to S18 described below.

On the other hand, when the check circle 35G has been specified by the user, the touch panel function detects that this specification has been accepted (as shown by a filled circle in FIG. 10), any page corresponding to a print target has been entered into the specification field 35L by the user, the touch panel function detects that this entry has been accepted (as shown by "1, 3, 5, 7-9" in FIG. 10), the OK key 35I has been specified by the user, and the touch panel function detects this specification has been accepted (YES in S13), the control section 21 determines that a request to print page units (for example, pages 1, 3, 5, and 7-9) of the document data has been given. Then, the readout control section 23 uses a result of analysis of the association information of the metadata M1 to read printer language data constituting the specified page units as the data portion corresponding to the print target area from the USB memory 2 (S14: third readout step). In other words, the readout control section 23 reads from the USB memory 2, for example, a data portion representing the contents of pages 1, 3, 5, and 7-9 of the document data generated into the print job J1.

Figure 11:
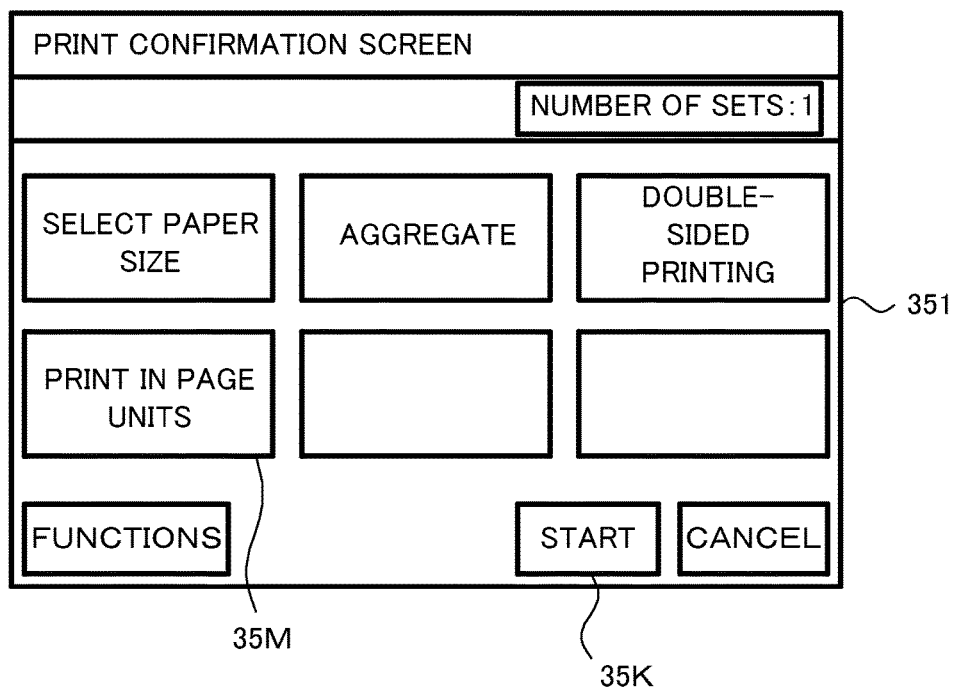
FIG. 11 is a view showing an example of still another display screen displayed on the display section of the image forming apparatus.

Subsequently, the display control section 22 allows the display section 351 to display a display prompting the user to confirm that print processing for the above page units should be executed (S15). For example, as illustrated in FIG. 11, the display control section 23 allows the display section

351 to display a display screen containing a Print in Page Units key 35M and the Start key 35K.

Next, the control section 21 determines whether or not a user's instruction to execute the print processing for the page units has been accepted by the operation acceptance section 35 (S16). For example, the control section 21 determines whether or not the Print in Page Units key 35M and the Start key 35K in the display screen shown in FIG. 11 have been specified by the user. When the above touch panel function does not detect that the Print in Page Units key 35M and the Start key 35K have been specified (NO in S16), the control section 21 allows the image forming apparatus 1 to stand by.

On the other hand, when the Print in Page Units key 35M and the Start key 35K have been specified by the user and the touch panel function detects that this specification has been accepted (YES in S16), the control section 21 determines that a user's instruction to execute the print processing for the page units has been given. Then, the control section 21 allows the printing section 32 to perform the print processing based on the read printer language data constituting the page units (S17: printing step). Thereafter, the process proceeds to S25 described below.

Figure 12:
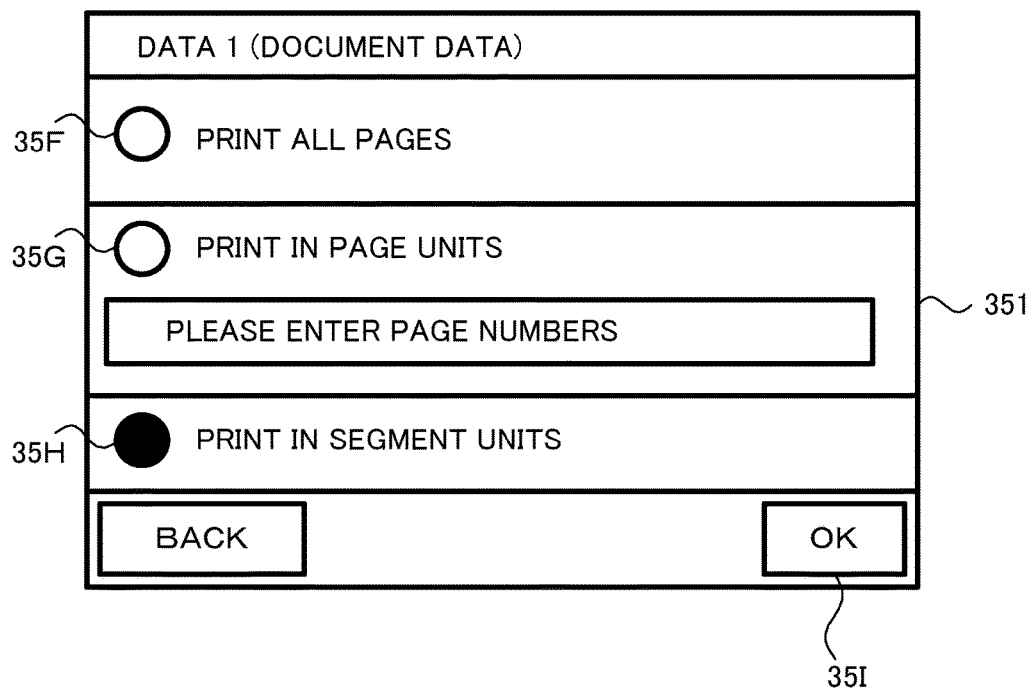
FIG. 12 is a view showing an example of still another display screen displayed on the display section of the image forming apparatus.

When the process proceeds to S18 (NO in S13), the control section 21 detects whether or not the check circle 35H and the OK key 35I in the display screen shown in FIG. 12 have been specified by the user, and thus determines whether or not a user's instruction to print the document data in segment units has been given (S18). When the above touch panel function does not detect that the check circle 35H has been specified (NO in S18), the control section 21 determines that print processing for the print job J1 has been stopped, and the process proceeds to S25 described below.

On the other hand, when the check circle 35H has been specified by the user, the touch panel function detects that this specification has been accepted (as shown by a filled circle in FIG. 12), the OK key 35I has been specified by the user, and the touch panel function detects that this specification has been accepted (YES in S18), the control section 21 determines that a request to print the document data in segment units has been given.

Figure 13:
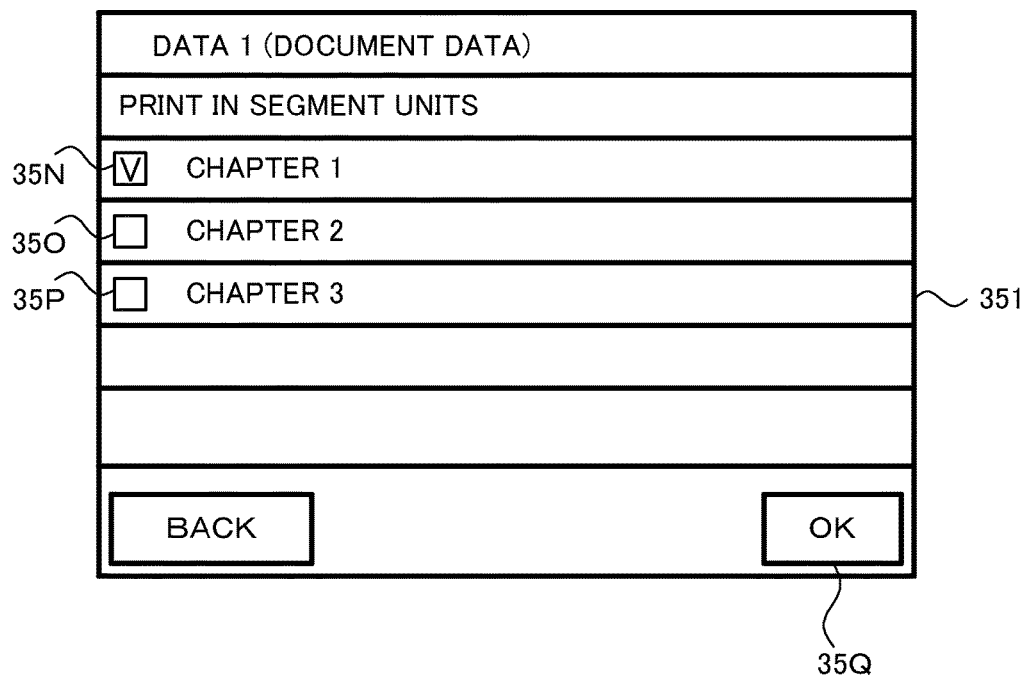
FIG. 13 is a view showing an example of still another display screen displayed on the display section of the image forming apparatus.

Subsequently, the display control section 22 allows the display section 351 to display the list created by the interpreter section 24 (S19). For example, as illustrated in FIG. 13, the display control section 22 allows the display section 351 to display "Chapter 1", "Chapter 2", and "Chapter 3" present in the document data generated into the print job J1. Furthermore, as shown in FIG. 13, in order that the user can specify each of the segment units "Chapter 1", "Chapter 2", and "Chapter 3" as a specification item, the display control section 22 allows the display section 351 to display check boxes 35N, 35O, and 35P in each of which an image indicating that it has been selected by the user can be displayed.

Subsequently, the control section 21 determines whether or not a user's request to specify at least one segment unit to be subjected to print processing has been accepted by the operation acceptance section 35 (S20). In other words, the control section 21 determines whether or not any chapter of the document data the print processing for which is desired by the user has been specified. For example, the control section 21 determines whether or not any of the check boxes 35N, 35O, and 35P and an OK key 35Q in the display screen shown in FIG. 13 have been specified by the user. When the above touch panel function does not detect that any of the check boxes 35N, 35O, and 35P has been specified (NO in S20), the control section 21 allows the image forming apparatus 1 to stand by.

On the other hand, for example, when the check box 35N has been specified by the user, the touch panel function detects that this specification has been accepted (as shown by a check mark "V" in FIG. 13), the OK key 35Q has been specified by the user, and the touch panel function detects that this specification has been accepted (YES in S20), the control section 21 determines that the segment "Chapter 1" has been specified as a segment unit to be subjected to print processing.

Subsequently, the readout control section 23 uses a result of analysis of the association information of the metadata M1 to read printer language data constituting the specified segment unit as the data portion corresponding to the print target area from the USB memory 2 (S21: third readout step). In other words, the readout control section 23 reads from the USB memory 2, for example, a data portion representing the contents of Chapter 1 of the document data generated into the print job J1.

Figure 14:
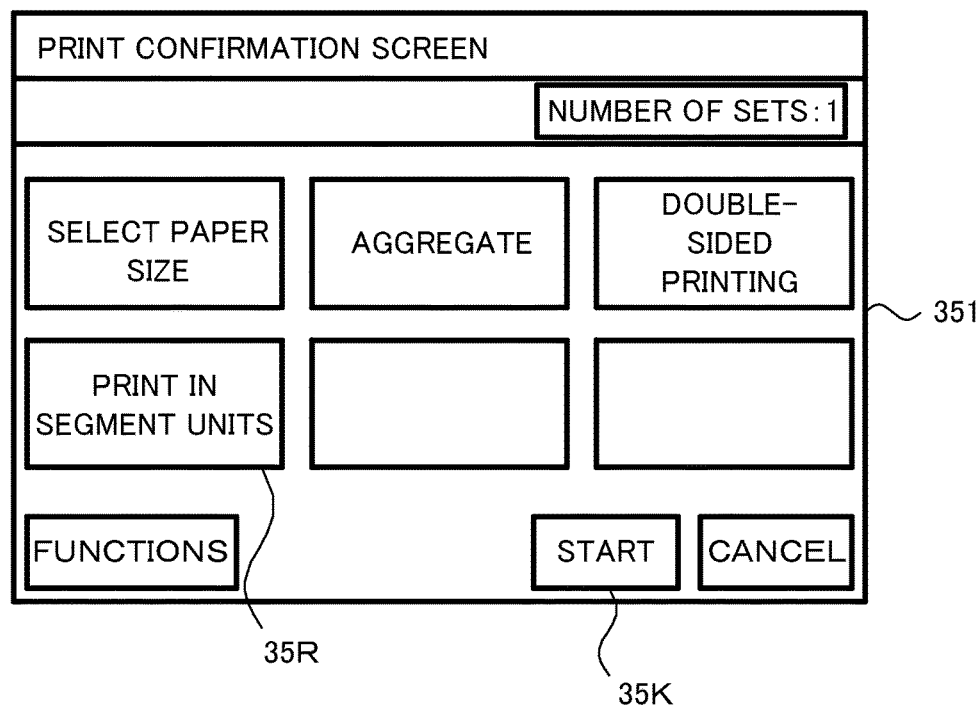
FIG. 14 is a view showing an example of still another display screen displayed on the display section of the image forming apparatus.

Subsequently, the display control section 22 allows the display section 351 to display a display prompting the user to confirm that print processing for the above segment unit should be executed (S22). For example, as illustrated in FIG. 14, the display control section 23 allows the display section 351 to display a display screen containing a Print in Segment Units key 35R and the Start key 35K.

Next, the control section 21 determines whether or not a user's instruction to execute the print processing for the segment unit has been accepted by the operation acceptance section 35 (S23). For example, the control section 21 determines whether or not the Print in Segment Units key 35R and the Start key 35K in the display screen shown in FIG. 14 have been specified by the user. When the user does not specify the Print in Segment Units key 35R and the Start key 35K (NO in S23), the control section 21 allows the image forming apparatus 1 to stand by.

On the other hand, when the Print in Segment Units key 35R and the Start key 35K have been specified by the user and the touch panel function detects that this specification has been accepted (YES in S23), the control section 21 determines that a user's instruction to execute the print processing for the segment unit has been given. Then, the control section 21 allows the printing section 32 to perform the print processing based on the read printer language data constituting the segment unit (S24: printing step).

Figure 15:
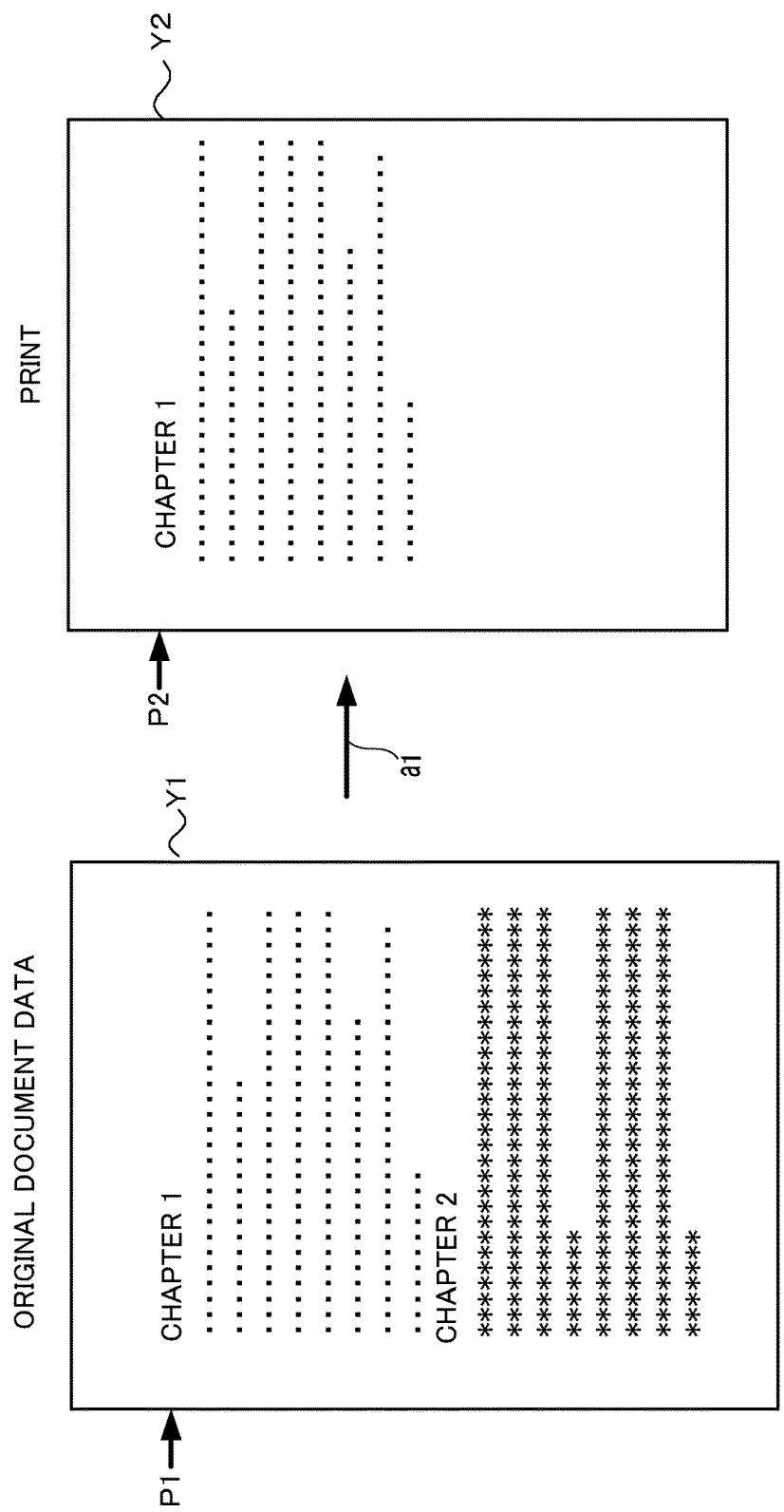
FIG. 15 is a view for illustrating an example of a result of print processing in a printing section of the image forming apparatus.

Furthermore, in the print processing at S24, the control section 21 uses a result of analysis of the association information of the metadata M1 to allow the printing section 32 to perform a printing operation of the print processing based on the printer language data constituting the segment unit, starting from a predetermined position of a recording paper sheet (for example, the head thereof). For example, suppose that, as shown in FIG. 15, in original document data stored in the USB memory 2, the contents of Chapters 1 and 2 are described on a recording paper sheet Y1 and the contents of Chapter 1 are described from the head P1 of the recording paper sheet Y1. In this case, if Chapter 1 is specified as the print target area, the control section 21 allows a print to be formed as shown by the arrow a1 from the original document data in the print processing at S24. Specifically, as seen from the print shown in FIG. 15, the control section 21 allows the printing section 32 to print the contents of Chapter 1 from the head P2 of a recording paper sheet Y2 which is a predetermined position of the recording paper sheet Y2.

Figure 16:
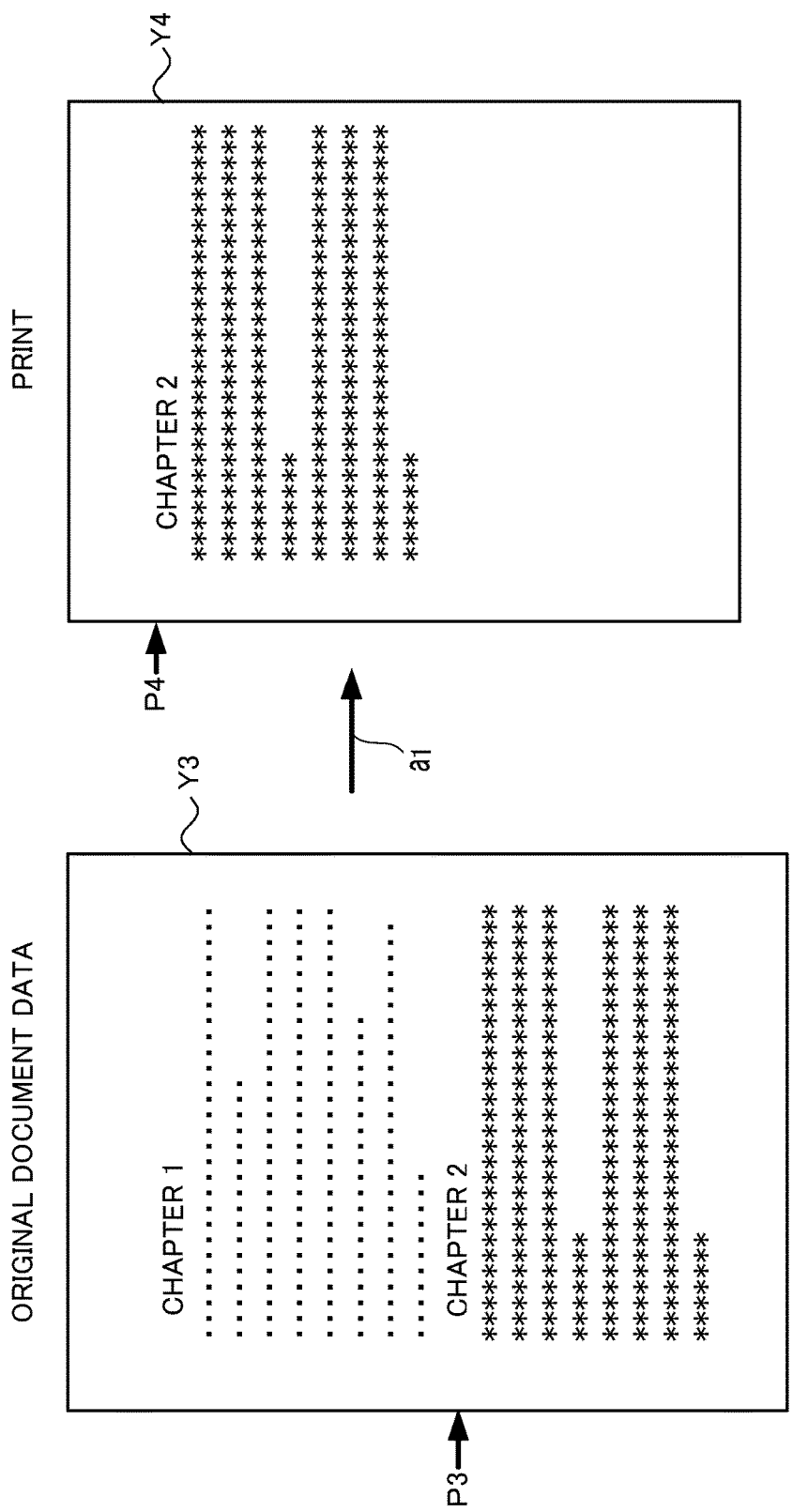
FIG. 16 is a view for illustrating an example of another result of print processing in the printing section of the image forming apparatus.

For another example, suppose that, as shown in FIG. 16, in the original document data, the contents of Chapters 1 and 2 are described on a recording paper sheet Y3 and the contents of Chapter 2 are described from the middle P3 of the recording paper sheet Y3. In this case, if Chapter 2 is specified as the print target area, the control section 21 allows a print to be formed as shown by the arrow a2 from the original document data in the print processing at S24. Specifically, as seen from the print shown in FIG. 16, the control section 21 allows the printing section 32 to print the contents of Chapter 2 by adjusting the position of Chapter 2 so that Chapter 2 is placed at the head P4 of a recording paper sheet Y4 which is a predetermined position of the recording paper sheet Y4. Since in this manner the control section 21 allows the contents of Chapter 2 to be printed at the head P4 of the recording paper sheet Y4, the contents of Chapter 2 can be easily visually recognized by the user as compared with the case where the contents of Chapter 2 are printed at the middle of the recording paper sheet Y4. Furthermore, even when Chapter 2 is described, for example, across page boundary in the original document data, the start of printing from the sheet head P4 enables the description of Chapter 2 to be provided in the form of a single piece of printed paper.

Subsequently, the control section 21 determines whether or not print processing for all print jobs specified at S4 has been completed (S25). When detecting any print job the print processing for which has not been completed, the control section 21 determines that the print processing for the print job needs to be executed, and the process goes back to S5 and executes the processing again. On the other hand, when detecting that print processing for all the specified print jobs has been completed, the control section 21 ends the processing operation.

As thus far described, in this embodiment, the readout control section 23 reads metadata on a print job from the USB memory (external memory) 2. The interpreter section 34 analyzes the read metadata. The display control section 22 uses a result of analysis of attribute information of the metadata in the interpreter section 24 to allow the display section 351 to display a display prompting the user to specify any print target area to be subjected to print processing in document data generated as the print job. The readout control section 23 uses a result of analysis of association information of the metadata to read from the USB memory 2 a portion of printer language data contained in the print job, the portion corresponding to the specified print target area. The control section 21 allows the printing section 32 to perform print processing based on the read portion of printer language data corresponding to the print target area according to an execution program read by the readout control section 23. As a result, unlike the general image forming apparatus described in BACKGROUND above, in the case where the image forming apparatus according to this embodiment performs print processing of data stored in the USB memory 2, it is possible to easily subject only a data portion desired by the user to the print processing.

In the general image forming apparatus described in BACKGROUND, it is not possible to subject only a user-desired portion of data, a file or the like previously stored in a USB memory (external memory) to print processing. In other words, both the first and second techniques described in BACKGROUND are not those for subjecting only a user-desired portion to print processing.

Unlike the above techniques, according to this embodiment, it is possible, in performing print processing of data stored in the external memory, to easily subject only a user-desired data portion to the print processing.

Furthermore, according to this embodiment, when the operation acceptance section 35 accepts a request to specify at least one print job to be subjected to print processing from the user, the readout control section 23 reads from the USB memory 2 metadata created in association with the specified print job. Since thus in this embodiment only metadata on the print job the print processing for which is desired by the user is read out, the load of analysis processing of the metadata on the interpreter section 24 can be reduced.

Moreover, in this embodiment, when the operation acceptance section 35 accepts a request to specify a print target area from the user, the readout control section 23 uses a result of analysis of association information of the metadata to read from the USB memory 2 a portion of printer language data contained in the print job, the portion corresponding to the print target area specified by the request. Since thus in this embodiment only such a portion of printer language data the print processing for which is desired by the user is read out, the space used in a storage section, such as the image memory 33, for storing data can be reduced and the processing time taken from data readout processing to print processing on the image forming apparatus 1 can be reduced.

In addition, in this embodiment, the interpreter section 24 creates a list of a plurality of determined segment units. When the operation acceptance section 35 accepts a request to specify 'segment units' as a print target area from the user, the display control section 22 allows the display section 351 to display the above list showing the plurality of segment units as specification items. Therefore, in this embodiment, when the user desires print processing in segment units, the user can easily specify any segment unit.

Although the above description has been given of a configuration in which list information is read out according to the execution program, the present disclosure is not limited to this and no limitation is placed on information readout according to the execution program except that metadata is read out according to the execution program.

The structure and processing described in the above embodiment with reference to FIGS. 1 to 16 are merely illustrative of the present disclosure and the present disclosure is not intended to be limited to the above structure and processing.

While the present disclosure has been described in detail with reference to the embodiments thereof, it would be apparent to those skilled in the art the various changes and modifications may be made therein within the scope defined by the appended claims.

What is claimed is:
1. An image forming apparatus comprising:
a display section;
an operation acceptance section that accepts an operating instruction from a user;
a printing section that performs print processing on a recording medium;
an external terminal allowing an external memory to be connected thereto;
a display control section that controls a display operation of the display section;
a readout control section that performs processing for reading data through the external terminal from the external memory;
an interpreter section that analyzes metadata read from the external memory; and
a control section that controls the printing section,
wherein when the external memory is connected to the external terminal, the readout control section reads from the external memory an execution program for starting execution of the print processing, the readout control section further reads the metadata from the external memory according to the read execution program, the metadata containing: attribute information indicating a predetermined attribute of document data converted to printer language data contained in a print job to be subjected to the print processing; and association information for associating the printer language data with the document data, the interpreter section analyzes the attribute information and the association information of the metadata read by the readout control section, the display control section uses a result of analysis of the attribute information in the interpreter section to allow the display section to display: a file name representing the document data and previously contained as a portion of the attribute information in the metadata; and a display prompting the user to specify a print target area of the document data to be subjected to the print processing, when the operation acceptance section accepts a request to specify the print target area from the user, the readout control section uses a result of analysis of the association information in the interpreter section to read from the external memory a portion of the printer language data contained in the print job, the portion corresponding to the print target area specified by the request, and when the readout control section reads the portion of printer language data corresponding to the specified print target area, the control section allows the printing section to perform the print processing based on the read portion of printer language data corresponding to the print target area according to the execution program read by the readout control section.

2. The image forming apparatus according to claim 1, wherein the readout control section reads list information showing a list of a plurality of the print jobs from the external memory according to the execution program, the display control section allows the display section to display a display prompting the user to specify at least one of the print jobs to be subjected to the print processing, based on the list information read by the readout control section, when the operation acceptance section accepts a request to specify the at least one print job to be subjected to the print processing from the user, the readout control section reads from the external memory the metadata created in association with the specified print job, the interpreter section analyzes the attribute information and the association information of the metadata created in association with the specified print job and read by the readout control section, the display control section uses a result of analysis by the interpreter section on the attribute information of the metadata created in association with the specified print job to allow the display section to display: a file name representing the document data and previously contained as a portion of the attribute information in the metadata; and a display prompting the user to specify a print target area of the document data to be subjected to the print processing, when the operation acceptance section accepts a request to specify the print target area from the user, the readout control section uses a result of analysis by the interpreter section on the association information of the metadata created in association with the specified print job to read from the external memory a portion of the printer language data contained in the print job, the portion corresponding to the print target area specified by the request, and when the readout control section reads the portion of printer language data corresponding to the specified print target area, the control section allows the printing section to perform the print processing based on the read portion of printer language data corresponding to the print target area according to the execution program read by the readout control section.

3. The image forming apparatus according to claim 1, wherein the interpreter section analyzes the attribute information read by the readout control section to determine, as the print target area, a segment unit obtained by dividing the document data into predetermined segments, in relation to the display prompting the user to specify the print target area, the display control section allows the display section to display, as a specification item capable of being specified by the user, the segment unit determined by the interpreter section, and when the operation acceptance section accepts a request to specify the segment unit as the print target area from the user, the readout control section uses a result of analysis of the association information to read from the external memory printer language data constituting the specified segment unit as the portion corresponding to the print target area.

4. The image forming apparatus according to claim 3, wherein the interpreter section analyzes the attribute information read by the readout control section to determine, as the print target areas, not only the segment unit but also all pages of the document data and page units of the document data, in relation to the display prompting the user to specify the print target area, the display control section allows the display section to display, as specification items capable of being specified by the user, the segment unit, all the pages, and the page units determined by the interpreter section, and when the operation acceptance section accepts a request to specify all the pages as the print target area from the user, the readout control section uses the result of analysis of the association information to read from the external memory printer language data constituting all the pages as the portion corresponding to the print target area, and when the operation acceptance section accepts a request to specify at least one of the page units as the print target area from the user, the readout control section uses the result of analysis of the association information to read from the external memory printer language data constituting the specified page unit as the portion corresponding to the print target area.

5. The image forming apparatus according to claim 3, wherein the interpreter section creates a list of a plurality of the determined segment units, when the operation acceptance section accepts a request to specify the segment units as the print target area from the user, the display control section allows the display section to display the list showing the plurality of segment units as specification items, and when the operation acceptance section accepts a request to specify at least one of the segment units as the print target area from the user, the readout control section uses the result of analysis of the association information to read from the external memory printer language data constituting the specified segment unit as the portion corresponding to the print target area.

6. The image forming apparatus according to claim 3, wherein when the operation acceptance section accepts a request to specify the segment unit as the print target area from the user, the control section uses the result of analysis of the association information to allow the printing section to perform a printing operation of the print processing based on the printer language data constituting the segment unit and being the portion corresponding to the print target area, starting from a predetermined position of the recording medium.

7. The image forming apparatus according to claim 3, wherein the interpreter section creates the predetermined segments by dividing the document data by each word indicating a chapter contained in the document data.

8. The image forming apparatus according to claim 1, wherein before the control section allows the printing section to perform the print processing, the display control section allows the display section to display a display prompting the user to confirm that the print processing should be executed.

9. An image forming method for an image forming apparatus, the method comprising:
   a first readout step of reading from an external memory an execution program for starting execution of print processing in a printing section;
   a second readout step of reading metadata from the external memory according to the read execution program, the metadata containing attribute information indicating a predetermined attribute of document data converted to printer language data contained in a print job to be subjected to the print processing and association information for associating the printer language data with the document data;
   an analyzing step of analyzing the attribute information and the association information of the read metadata;
   a displaying step of using a result of analysis of the attribute information to display a file name representing the document data and previously contained as a portion of the attribute information in the metadata and a display prompting a user to specify a print target area of the document data to be subjected to the print processing;
   a third readout step of, when an operation acceptance section accepts a request to specify the print target area from the user, using a result of analysis of the association information to read from the external memory a portion of the printer language data contained in the print job, the portion corresponding to the print target area specified by the request; and
   a printing step of, upon readout of the portion of printer language data corresponding to the specified print target area, performing the print processing based on the read portion of printer language data corresponding to the print target area according to the read execution program.

* * * * *